Feb. 23, 1932.   R. J. DORSETT   1,846,416
AUTOMOBILE DIRECTION SIGNAL
Filed Sept. 26, 1930   2 Sheets-Sheet 1
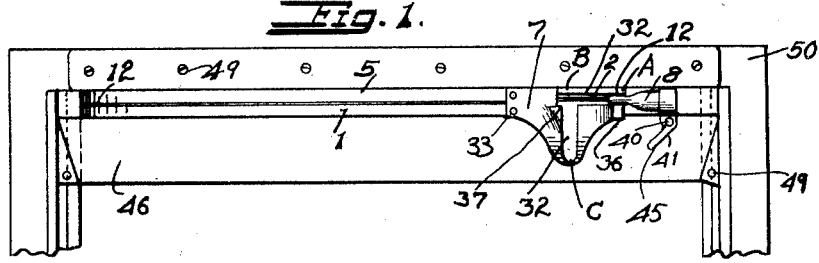
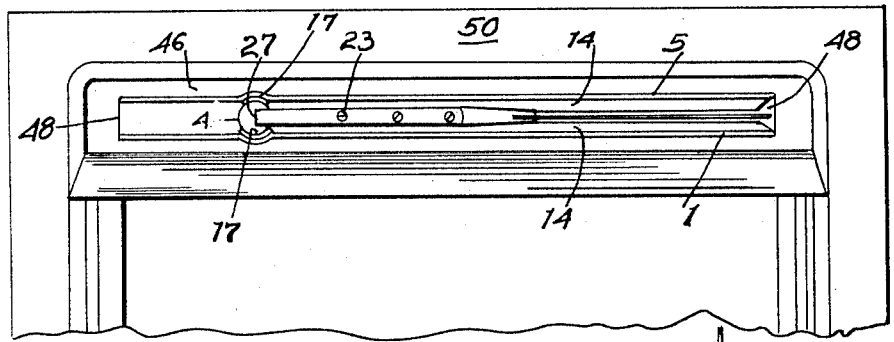
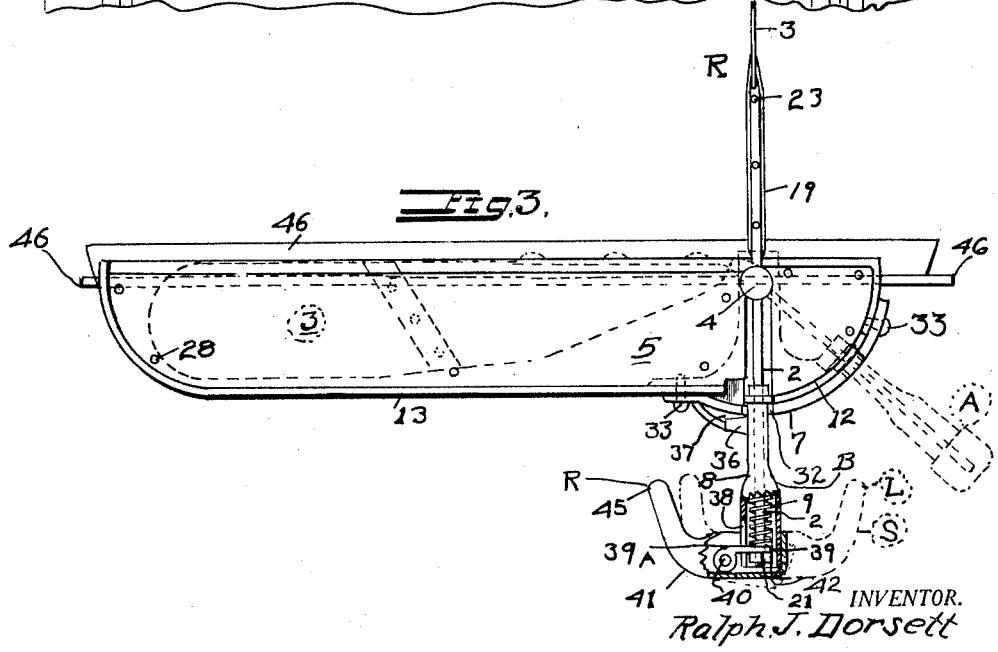
INVENTOR.
Ralph J. Dorsett
BY John H. Morgan
ATTORNEY.

Feb. 23, 1932.     R. J. DORSETT     1,846,416
AUTOMOBILE DIRECTION SIGNAL
Filed Sept. 26, 1930    2 Sheets-Sheet 2
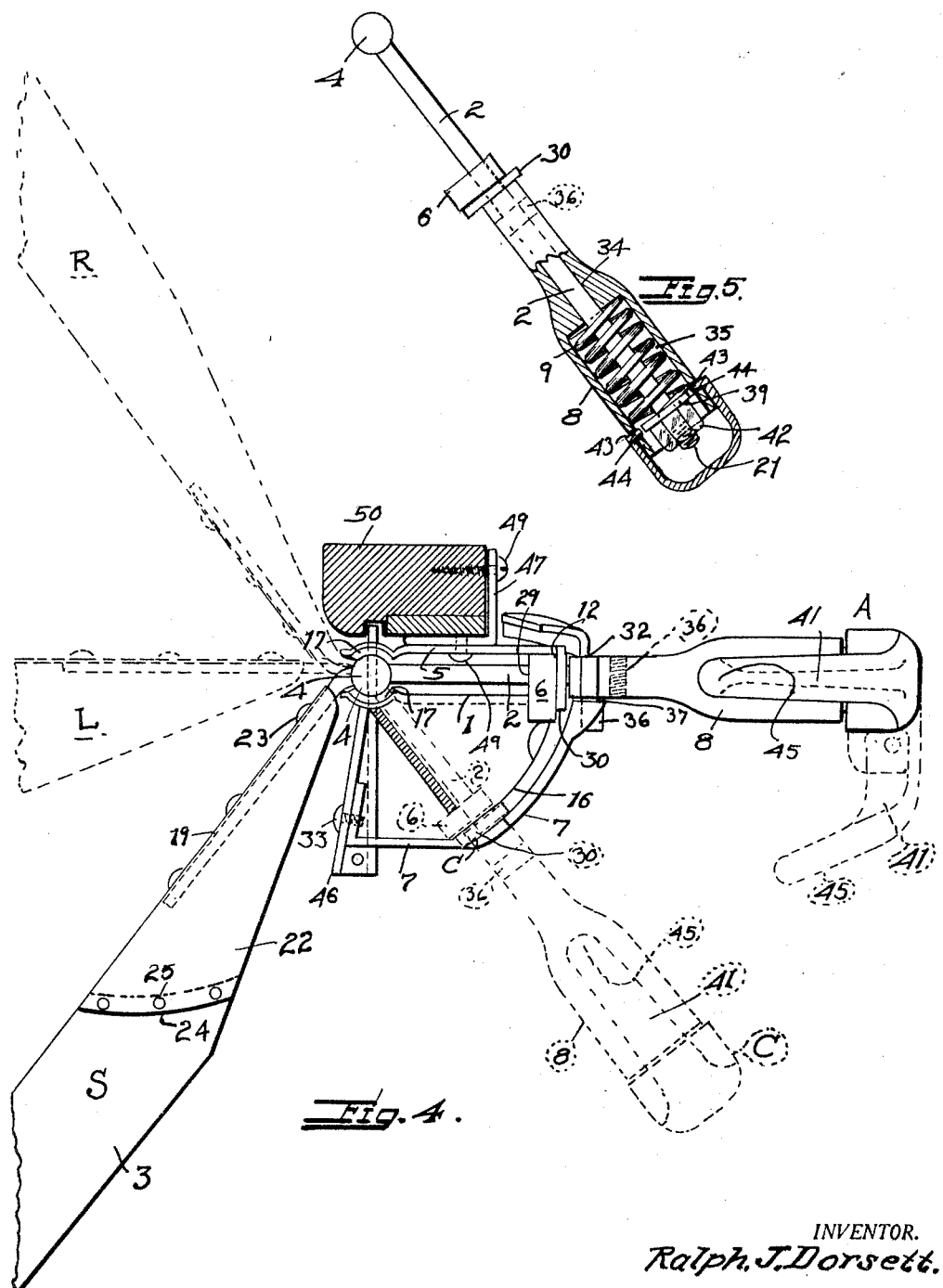
INVENTOR.
Ralph J. Dorsett.
BY John H. Morgan
ATTORNEY.

Patented Feb. 23, 1932

1,846,416

UNITED STATES PATENT OFFICE

RALPH J. DORSETT, OF SAN FRANCISCO, CALIFORNIA, ASSIGNOR TO INVENTORS' CO-OPERATIVE, INC., OF RENO, NEVADA, A CORPORATION OF NEVADA

AUTOMOBILE DIRECTION SIGNAL

Application filed September 26, 1930. Serial No. 484,531.

My invention relates to improvements in automobile direction signals, and has for its object to provide a simple and substantially constructed automobile direction signal to be easily attached to any style of automobile body, and requiring no special skill to properly install the same.

An object of my invention is to provide a device of the character indicated comprising a novel combination and arrangement of the parts, by stamping the principal parts as far as practical out of sheet metal and further providing a means for concealing the signal member when the same is not in use. A further object is to provide positive stops for each signalling position. Another object is the provision in a device of this character a non-rigid or flexible vane for the signal member of soft material, preferably semi-rigid rubber. Other further objects are to provide a device of this character that will be neat in appearance, easy and handy to operate, with no obstruction to the driver's vision and inconspicuous when not in use, thus obtaining an economical and positively reliable means of giving the three required signals, operation entirely mechanical.

Referring to the drawings:

Figure 1 is a view from the inside of an automobile body showing the signal unit installed in the upper part of the window frame.

Figure 2 is an outside view showing the signal vane in its receiving pocket.

Figure 3 is a plan of the device on a larger scale illustrating some of the details of construction.

Figure 4 is a view partly in section on still a larger scale showing in full, and in dotted lines three positions of the signal vane.

Figure 5 is a sectional view of the operating handle as it would appear in the position shown by the dotted lines in Figure 4.

In the drawings and following description, similar numerals refer to similar parts throughout the several views.

Plates 1 and 5 are similar in shape, and are spaced apart, and rounded on the ends as indicated by 12. There is a flange 13 along one of their edges, and at the rounded ends, and it is beveled at 14 upwardly and outwardly flaring along their opposite edges.

The plates 1 and 5 have aligned socket recesses 17 to form a complete socket for the ball 4. A rod 2 has a bearing in the ball, and is bent at an angle of approximately 45 degrees at the point 18.

The signalling member has a rigid portion 22 being wedge shaped and fastened to flattened end 19 of rod 2 by means of screws 23. Said rigid portion 22 of the signal member being slotted at its outer end 24 into which is inserted the thin vane 3 of the said signal member and is made fast therein by rivets 25—25, Fig. 4.

The rod 2 is inserted into square hole 27 in ball 4, loosely and together laid in ball socket 17 in plate 1, plate 5 with its corresponding ball socket 17 is laid over ball 4, the plates 1 and 5 are screwed together by means of screws or bolts in the plurality of holes 28, thus forming a complete casing to the signal member 3 and its inner moving parts.

The lug 6 has a square hole 29 and fits on a squared portion of the rod 2 and the washer 30 fits around rod 2 loosely, the washer 30 bearing against the curved edges 12 on plates 1 and 5 and 16, as in Fig. 3-4.

The lug 6 is extended to form a guiding member as shown at 31 for the different movements of the rod 2 as the signal member is moved to the various positions, the lug 6 is adapted to slide in the horizontal slot to bring the signal vane into position indicating "stop" and "right" turn, and to be pushed down a vertical slot for the "left" turn signal. When the lug and handle are in the forward position in the horizontal slot, the signal vane lies in the receptacle between plates 1 and 5, leaving only the thin edge of the vane and arm visible from the outside, and thus a signal means is provided that is not conspicuous, but which can be brought into instant use.

The apron 7, a detachable covering of the casing to plates 1 and 5 and placed in position over and around the curved edges 12—16 allowing the rod 2 to extend through slots 32 as shown in apron 7 and is secured to plates 1—5 by screws 33, Figs. 3–4.

Handle 8 has a square shaft hole 34 extending about one third the length of said handle, fitting loosely and permitting the same a sliding movement on square rod 2. The handle, also, has a larger hole 35 sufficient to incase the spring 9 which in turn fits around rod 2. At the smaller end of handle a lug 36, is formed as part of handle 8. Said lug drops into a notch No. 37 in the apron 7 and locks signal member uprightly when moved into position B, see Figs. 3–4. At the larger end of the handle there is a longitudinal slot No. 38 to permit free and easy room for annular portion of the washer 39 projecting from 39A and fitting on rod 2 at threaded end 21 by means of a corresponding shaft hole in the same washer. In the annular part 39A of washer 39 there is a pivot hole corresponding to hole No. 40 as shown in lever No. 41. The washer to fit tight to rod 2 by nut 42. Slots No. 43 are inserted crosswise on each side at larger end of handle 8 to permit two opposite pivot prongs No. 44 in lever 41 in the inner under side of the said lever at its enlarged portion.

A canopy 46 slotted at 48 to fit to the beveled edges 14—14 of plates 1 and 5 variedly shaped as required in the different types of automobile door sash 50, Figs. 1–2, making thereby a neat appearance to the device.

A bracket 47 angular in shape of desired length and weight to support the whole device with means provided by screws 49 to secure the same to automobile door sash 50, Figs. 1–4.

In the operation of the device as shown in Figures 1 and 4, by gripping handle 8 by the palm of the hand and pulling the same from position A to position B and pushing lever 41 forwardly from perpendicular to a horizontal position the signal member will swing outwardly from the casing pocket and turn downwardly at an angle of 45 degrees indicating stop signal; further by gripping the lever 41 between the thumb and fore finger and pulling the same from position A to position B automatically will throw signal member outwardly and upwardly to 45 degrees turning from a horizontal to an upright position indicating right turn signal.

It can be seen that by means of the prongs No. 44 on said lever 41 inserted into slots No. 43 in handle 8 and pinning said lever 41 to washer 39A, I have shown a lock lug member No. 36 on smaller end of handle 8 when in engagement with notch No. 37, now by hitting with the palm of the hand at outer curved end No. 45 of lever 41 sliding handle backward against tension of spring 9 it will release the lug from the notch, see Figs. 3–4.

Again, by gripping handle 8 the same as in making stop signal above mentioned, and pulling by the palm of the hand the handle 8 from position A to position B and pulling downwardly to position C, signal member will then point straight out, indicating left turn signal, Fig. 3.

Having described my invention in detail and its method of operation, I do not desire to be limited to the construction therein described and set forth, as modifications may be required without departing from the spirit of the invention which provides a simple, safe and economical means of performing the purpose intended and what I desire to protect by Letters Patent is:

1. An automobile direction signal of the class described comprising spaced plates, a rotatable ball mounted between said plates, a rod projecting through said ball, a signal member on one end of said rod, a handle on the other end, slotted guideways for the handle, a horizontal recess between said plates adapted to receive said signal member whereby the signal member can be moved by said handle from said recess to various signal positions.

2. A hand operated direction signal of the class described, comprising a rod, a ball bearing for said rod, a signal member mounted on said rod at an angle thereto, a recess to receive said signal member edgewise, means to move the signal member out of the recess, means to turn the rod to throw the signal member up at an angle to indicate right hand turn, or down at an angle to indicate a stop signal, means to move the rod on its pivot to bring the signal member to a horizontal position indicating a left turn, and means to turn the signal member edgewise, and swing it into said recess.

3. A hand operated direction signal of the class described comprising a frame, a signal vane on one side of said frame, an operating rod on the other side of said frame for said vane, a ball and socket mounting for said rod, a horizontal recess opening on the outside to receive said vane edgewise in said frame, and means for guiding said operating rod for bringing the vane out of the recess to the required positions for the various signals.

4. A direction signal of the class described comprising a frame, a longitudinal recess in said frame, an opening to said recess from the outside of said frame, a ball mounted in a socket in said frame, a rod in said ball projecting on the inside of the frame to form an operating handle, and projecting from the outside of said frame at an angle equal to the signal angle required from the horizontal to said handle, a signal vane fixed to said outside portion, the projecting rod and vane adapted to fit into said recess edgewise, horizontal and vertical guides for said handle portion whereby the vane is swung out of the recess and the handle turned to bring the angle of the vane downward for a stop signal, up for a right hand turn, and brought straight out for a left hand turn signal by pushing down on the handle.

5. A direction signal of the class described comprising upper and lower spaced plate members, a bracket adapted to hold the plates to the upper part of a window frame, meeting flanges on the inside edges of said plates to form a receptacle open on the outside, and closed on the inside, a ball and socket adjacent the forward end, and between said plates, a rod mounted in said ball and projecting from the inside of said plates to form a handle portion, said rod projecting from the outside of the plates, and bent at an angle to said handle portion, a flat vane fixed to said bent portion, guiding slots for the handle portion in said plates whereby the handle may be moved to throw the vane into or out of said receptacle edgewise, to turn the vane up at an angle indicating a right turn, to turn it down at an angle indicating a stop, and to swing it straight out indicating a left turn.

6. A direction signal of the class described comprising a receptacle, means to mount said receptacle in the upper part of a window frame, an opening on the outside of said receptacle, a movable signal member in said receptacle, a handle for said signal member on the inside of said receptacle, guiding slots for said handle whereby said signal member may be moved to swing out of said receptacle by pulling back on said handle, to turn the signal member up for a right hand turn by turning said handle clockwise, to turn said signal member down for a stop signal by turning said handle counter-clockwise, and to bring the signal member in—a straight out position for a left turn signal, by pushing down on the handle, and means to lock the handle in position with the signal member in the receptacle, and a spring release means for said handle.

7. A direction signal of the class described comprising a rectangular receptacle open along one of its longitudinal edges, means to attach said receptacle to a window frame, a ball and socket adjacent one end of said receptacle, a rod mounted in said ball, a shield member having a horizontal slot and a vertical slot extending from said horizontal slot, through which said rod projects, a spring retained slidable handle on said rod, a projecting lug on said handle, a notch in said shield to receive said lug, an auxiliary lever pivoted on said handle and adapted to slide said handle back against its spring to release said lug from the notch in said shield, a guiding lug on said rod adapted to follow in said slots, said rod projecting from the open side of said receptacle and bent at an angle to the handle portion, a flat vane fixed to said bent portion and adapted to lie with the flat side on a horizontal plane in said receptacle.

RALPH J. DORSETT.